(12) United States Patent
Jia et al.

(10) Patent No.: US 12,107,739 B2
(45) Date of Patent: Oct. 1, 2024

(54) FACILITATING NOTIFICATION AND CORRECTIVE ACTIONS RELATED TO ENDPOINT QUALITY OF SERVICE LOSSES IN FIFTH GENERATION (5G) OR OTHER ADVANCED NETWORKS

(71) Applicant: AT&T Intellectual Property I, L.P., Atlanta, GA (US)

(72) Inventors: Yupeng Jia, Austin, TX (US); James Pratt, Round Rock, TX (US); Eric Zavesky, Austin, TX (US); Gregory Edwards, Austin, TX (US); Michael Gonzales, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 412 days.

(21) Appl. No.: 16/710,165

(22) Filed: Dec. 11, 2019

(65) Prior Publication Data
US 2021/0184943 A1  Jun. 17, 2021

(51) Int. Cl.
*H04W 28/02* (2009.01)
*H04L 41/5009* (2022.01)
*H04W 28/16* (2009.01)

(52) U.S. Cl.
CPC ..... *H04L 41/5009* (2013.01); *H04W 28/0226* (2013.01); *H04W 28/0268* (2013.01); *H04W 28/16* (2013.01)

(58) Field of Classification Search
None
See application file for complete search history.

(56) References Cited

U.S. PATENT DOCUMENTS

| | | |
|---|---|---|
| 10,952,024 B2 | 3/2021 | Jia et al. |
| 2015/0341869 A1 | 11/2015 | Sen et al. |
| 2015/0373565 A1* | 12/2015 | Safavi ................. H04L 41/5067 370/252 |
| 2016/0360429 A1* | 12/2016 | Li ......................... H04W 88/08 |
| 2017/0118715 A1 | 4/2017 | Bhattacharya et al. |
| 2018/0205471 A1* | 7/2018 | Goodbody ......... H04B 17/3913 |
| 2020/0107296 A1 | 4/2020 | Zhang et al. |

(Continued)

OTHER PUBLICATIONS

Palladino, "Magic Leap App SeeSignal Uses AR to Help You Find & Touch the Strongest Cellular, Wi-Fi, & Bluetooth Signals" AR Buisness, Sep. 30, 2019. 5 pages.

(Continued)

*Primary Examiner* — Mohammad S Adhami
(74) *Attorney, Agent, or Firm* — Guntin & Gust, PLC; Dana B. LeMoine

(57) ABSTRACT

Facilitating notification and corrective actions related to endpoint quality of service losses in advanced networks (e.g., 5G, 6G, and beyond) is provided herein. Operations of a method can comprise determining, by a system comprising a processor, that a quality of service level for a mobile device within a communications network has degraded below a threshold quality of service level. The method also can comprise in response to the determining, selecting, by the system, an action to be performed at a mobile device. The action can increase the quality of service level for the mobile device above the threshold quality of service level. Further, the method can comprise providing, by the system and to the mobile device, information indicative of the action.

20 Claims, 13 Drawing Sheets

(56) References Cited

U.S. PATENT DOCUMENTS

| | | | | |
|---|---|---|---|---|
| 2020/0162331 | A1* | 5/2020 | Harpur | G06V 20/53 |
| 2020/0329340 | A1* | 10/2020 | Rahman | H04W 4/024 |
| 2021/0044927 | A1 | 2/2021 | Jia et al. | |
| 2021/0114616 | A1* | 4/2021 | Altman | H04W 40/02 |
| 2021/0119881 | A1 | 4/2021 | Shirazipour et al. | |
| 2021/0127231 | A1 | 4/2021 | Jia et al. | |

OTHER PUBLICATIONS

Non-Final Office Action received for U.S. Appl. No. 16/891,763 dated Feb. 9, 2022, 41 pages.
Antenna Selection And Device Orientation Pending U.S. Appl. No. 16/534,518, filed Aug. 7, 2019, 20 pages.
Wi-CHarge: Over-the-Air Wireless Power, Web accessed on May 20, 2022, https://www.wi-charge.com/., 4 pages.
The World's Most Powerful Low Light Energy Harvesting Photovoltaic Cells Ambient Photonics web accessed on May 20, 2022 https://ambientphotonics.com/technology., 2 pages.

* cited by examiner

FACILITATING NOTIFICATION AND CORRECTIVE ACTIONS RELATED TO ENDPOINT QUALITY OF SERVICE LOSSES IN FIFTH GENERATION (5G) OR OTHER ADVANCED NETWORKS

TECHNICAL FIELD

This disclosure relates generally to the field of mobile communications and, more specifically, to quality of service in Fifth Generation (5G), Sixth Generation (6G), or other advanced networks.

BACKGROUND

As the pervasiveness of user equipment devices continues to saturate network capabilities, users and network providers can experience periods of "good" or "bad" service in an area. Users can adapt by learning and understanding that a particular area in a city or building is a place to go for a good quality of service. However, the need for dynamic assistance with improving user experience remains unanswered. Additionally, the number and variety of available radio types continues to grow on each user equipment device (and network), however, intelligent switching across these radios has not been fully realized and instead is simply driven by what was last connected. Accordingly, unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
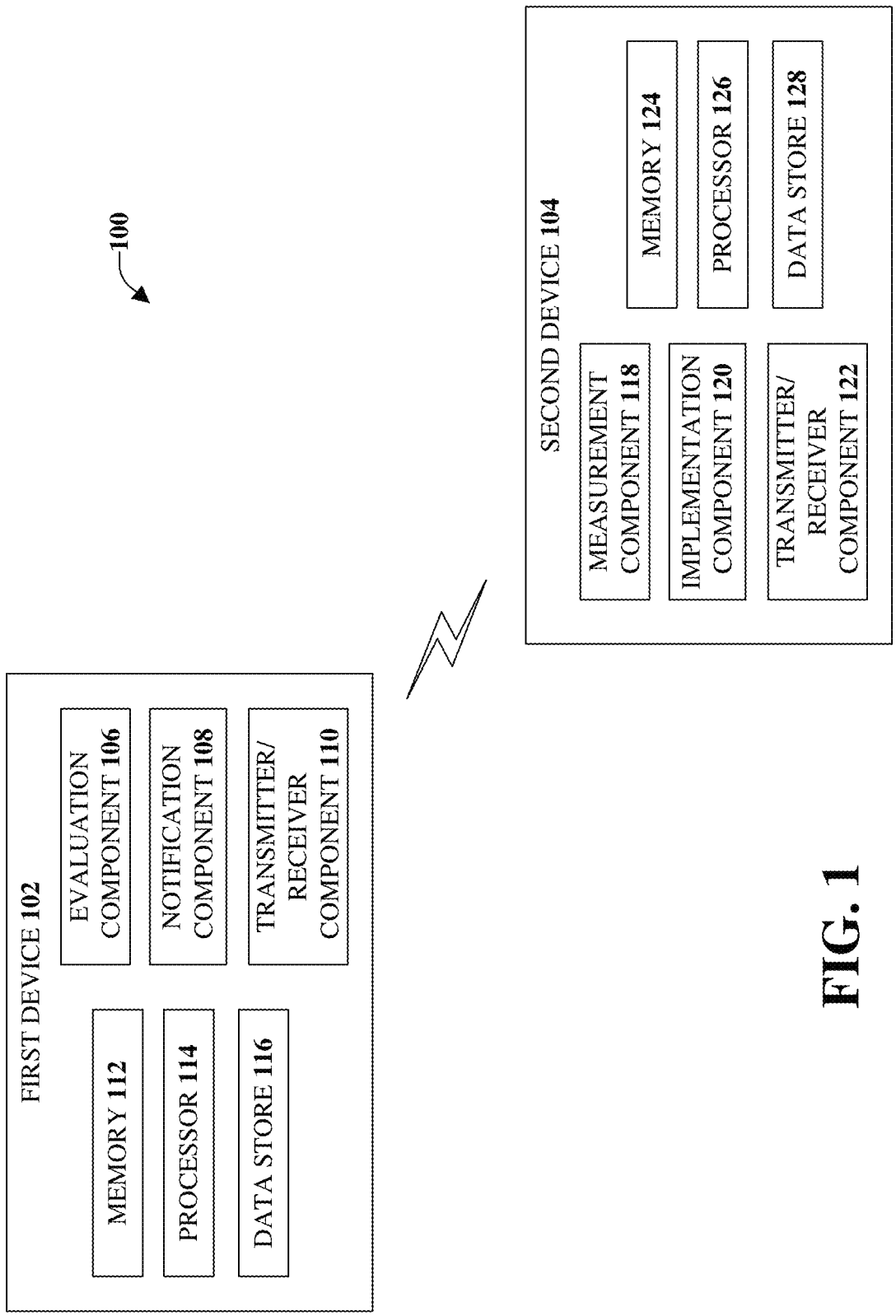
FIG. 1 illustrates an example, non-limiting, system for facilitating notification and corrective actions related to endpoint quality of service losses in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate notification and corrective actions related to endpoint quality of service losses in advanced networks. As mentioned above, as the pervasiveness of User Equipment devices (UEs) continues to saturate network capabilities, users and network providers can experience periods of "good" or "bad" service in an area. While users can adapt by learning and understanding that a particular area in a city or building is a place to go for a good Quality of Service (QoS), such as throughput, latency, and so on, the need for dynamic assistance with improving user experience remains unanswered. Additionally, the number and variety of available radio types continues to grow on each UE (and network), however, intelligent switching across these radios has not been fully realized and instead is simply driven by what was last connected. Finally, users themselves (both human and autonomous) can be empowered to change their location for better QoS if provided the tools to understand and adapt to different conditions.

According to an embodiment, provided is a system that can comprise a processor and a memory that stores executable instructions that, when executed by the processor, facilitate performance of operations. The operations can comprise determining an occurrence of a trigger event at a device. The trigger event can be related to a quality of service of a communication network being determined to have failed to satisfy a threshold quality level. Further, the quality of service of the communication network can be measured by the device. The operations also can comprise facilitating a first action at the device that causes a corresponding second action within the communication network.

Facilitating the first action can be based on the occurrence of the trigger event and based on a determination that the first action and the corresponding second action mapped to causing the quality of service to satisfy the threshold quality level.

In some implementations, the occurrence of the trigger event can be changeable based on an activity determined to be occurring at the device. Further to these implementations, the operations can comprise determining the activity is an augmented reality activity and selecting the first action as a movement of the device from a first location to a second location within the communication network. The corresponding second action can be related to a reduction of a latency within the communication network. Alternatively, the operations can comprise determining the activity is a voice communication and selecting the first action as a movement of the device from a first location to a second location within the communication network. The corresponding second action can be related to a change in a voice quality within the communication network.

According to some implementations, facilitating the first action at the device can comprise facilitating an output, at the device, of a suggested navigation from a first location to a second location within the communication network. Further to these implementations, facilitating the output of the suggested navigation can comprise facilitating a rendering, via a display of the device, a predicative map for user-guided navigation.

Facilitating the first action can comprise, according to some implementations, changing a communication mode of the device from a first communication mode to a second communication mode different from the first communication mode.

The operations can comprise, in some implementations, training a model on trigger events and actions that have been determined to have resolved the trigger events. The model can be trained to detect and resolve the trigger events to a defined confidence level.

According to some implementations, the device can be a network device of a group of network devices of the communication network. The corresponding second action can be a load balancing of respective communications associated with a group of user equipment devices within the communication network.

In some implementations, the device can be a first network device of a group of network devices of the communication network. In these implementations, the corresponding second action can be a deployment of a second network device within the communication network. The second network device can be added to the group of network devices.

In accordance with some implementations, the device can be a mobile device of the communication network. Further to these implementations, the first action can be a recommendation of a physical movement of the mobile device.

In another embodiment, provided is a method that can comprise determining, by a system comprising a processor, that a quality of service level for a mobile device within a communications network has degraded below a threshold quality of service level. The method also can comprise in response to the determining, selecting, by the system, an action to be performed at a mobile device. The action can increase the quality of service level for the mobile device above the threshold quality of service level. Further, the method can comprise providing, by the system and to the mobile device, information indicative of the action. The action can be performed at the mobile device.

According to some implementations, the action can be a movement of the mobile device from a first location to a second location and the quality of service level can be a first quality of service level. Further, the method can comprise determining, by the system, that the mobile device has moved to the second location and measuring, by the system, a second quality of service level of the mobile device at the second location. The method also can comprise retaining, by the system, respective information indicative of the first quality of service level, the second quality of service level, first data indicative of the first location, and second data indicative of the second location.

In accordance with some implementations, selecting the action to be performed at the mobile device can comprise determining an application executing on the mobile device is a time sensitive application. Further, selection of the action can comprise selecting the action as a movement of the mobile device from a first location to a second location within the communications network based on the application executing on the mobile device being the time sensitive application. The action can decrease an amount of latency within the communications network.

According to some implementations, selecting the action to be performed at the mobile device can comprise determining, by the system, an application executing on the mobile device is a non-time sensitive application. In addition, selecting the action to be performed can comprise selecting the action as a movement of the mobile device from a first location to a second location within the communications network based on the application executing on the mobile device being the non-time sensitive application. The action can increase a quality of a voice communication within the communications network.

In some implementations, selecting the action can comprise determining, by the system, a first communication mode of the mobile device, wherein the first communication mode is being utilized by the mobile device to communicate with other devices. Further, selecting the action can comprise selecting, by the system, a second communication mode for use by the mobile device to communicate with the other devices.

Providing the information indicative of the action can comprise, in some implementations, facilitating an output, at the mobile device, of an electronic mapping application that indicates alternative navigation routes.

Another embodiment can relate to a machine-readable storage medium, comprising executable instructions that, when executed by a processor, facilitate performance of operations. The operations can comprise determining a trigger event has occurred, wherein the trigger event indicates a quality of service associated with a device fails to satisfy a defined quality of service level. The operations also can comprise ascertaining a type of application executing on the device. Further, the operations can comprise determining that a movement of the device from a first location to a second location is expected to cause the quality of service associated with the device to satisfy the defined quality of service level. In addition, the operations can comprise facilitating an output, at the device, of information indicative of recommended routes from the first location to the second location.

In some implementations, the first location can comprise a first latency amount and the second location can comprise a second latency amount. Further to these implementations, the operations can comprise selecting the second location based on the second latency amount being less than the first latency amount and based on the type of application executing on the device being categorized as a time sensitive application.

According to some implementations, the first location can comprise a first voice quality level and the second location can comprise a second voice quality level. Further to these implementations, the operations can comprise selecting the second location based on the second voice quality level being a better voice quality than the first voice quality level and based on the type of application executing on the device being categorized as a non-time sensitive application.

With reference initially to FIG. 1, illustrated is an example, non-limiting, system 100 for facilitating notification and corrective actions related to endpoint quality of service losses in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a first device 102 and a second device 104. The first device 102 and/or the second device 104 can be a network device or a user equipment (UE) device. For example, the first device 102 can be a network device and the second device 104 can be a UE device. However, the disclosed aspects are not limited to this implementation and, for example, the first device 102 can be a network device and the second device 104 can be a network device. The network device can be included in a group of network devices of a wireless network. Although only two devices are shown and described, the various aspects are not limited to this implementation. Instead, multiple devices can be included in a communications system. According to some implementations, a device can be an autonomous vehicle (e.g., a self-driving vehicle). The first device 102 can include an evaluation component 106, a notification component 108, a transmitter/receiver component 110, at least one memory 112, at least one processor 114, and at least one data store 116. The second device 104 can include a measurement component 118, an implementation component 120, a transmitter/receiver component 122, at least one memory 124, at least one processor 126, and at least one data store 128. The evaluation component 106 can determine the occurrence of a trigger event at the second device 104. According to an implementation, a trigger event can be a repetitive loss of service (e.g., QoS). Another trigger event can be a QoS loss over time. Based on the occurrence of the trigger event a service related to notifications and corrective actions as discussed herein can be activated. For example, based on the loss of service (e.g., QoS), the disclosed aspects can be automatically activated. There can be multiple renditions of the activation. For example, there can be manual activation, where a user activates the services. In another example, there can be semi-auto activation where the services is off and a suggestion is output for the service to be activated (e.g., a manual activation). In other situations there can be automatic activation, wherein the service is activated and the user might (or might not) be notified of the activation.

In some implementations, the activation does not need to be at the user side, but can be network based. For example, the trigger can be the weather (or an expected weather condition), or potential crowds that are developing, which are not user observable because the user does not have a macro level view. The system can monitor the internal conditions and/or external conditions. The system might not trigger an activation until after a certain threshold level is reached, but is proactively monitoring the situation. For example, the system can know the maximum bandwidth is going to decrease, but it does not matter because the user is sending/receiving text messages and will not be affected. However, another user is streaming a video or some other time critical application. Therefore, the system will inform the devices streaming the video or other time critical application instead.

Upon or after activation, the measurement component 118 can measure the Quality of Service e(QoS) experienced by the second device 104. The measurement of the QoS can be sent from the second device 104 (e.g., via the transmitter/receiver component 122) and received at the first device 102 (e.g., via the transmitter/receiver component 110).

Upon or after receipt of the QoS, or information indicative of the QoS, from the second device 104, the evaluation component 1006 can determine whether the QoS satisfies a threshold quality level or fails to satisfy the threshold quality level. The threshold quality level can be determined based on service level agreements or based on other criteria (e.g., statistics related to a call drop rate, user experience criteria or surveys, and so on). If the QoS satisfies (e.g., is at or above) the threshold quality level, no action is taken. However, if the QoS fails to satisfy (e.g., is below) the threshold quality level it can indicate that the trigger event has occurred.

In the case where the QoS fails to satisfy the threshold quality level, the notification component 108 facilitates a first action at the second device 104. For example, the notification component 108 can send (e.g., via the transmitter/receiver component 110) instructions and/or data indicative of an action to be performed at the second device 104. The data indicative of the action can be received at the second device 104 (e.g., via the transmitter/receiver component 122) and the implementation component 120 can implement the action at the second device 104. For example, the action to be implemented can be a rendering (in any perceivable format) of physical movement suggestions, changing of a communication mode, or other actions selected to increase a QoS level.

According to some implementations, the action can be selected by the first device 102 such that a corresponding second action occurs within the communication network. For example, it can be determined that the facilitation of the first action is based on the occurrence of the trigger event and based on a determination that the first action and the corresponding second action are mapped to causing the QoS to satisfy the threshold quality level.

By way of example and not limitation, the first action can be a movement of the second device 104 from a first location to a second location and the second action can be an increase in the level of QoS for the second device 104. In another non-limiting example, the first action can be a change in the communication mode of the second device 104. For example, the second device 104 could be using a cellular network to communicate, however, Wi-Fi is available (and has a better signal strength). Therefore, the first action can be to automatically switch from the cellular network (e.g., first communication mode) to the Wi-Fi network (e.g., second communication mode) and the second action can be an increase in QoS for the second device 104.

In yet another non-limiting example, there can be twenty devices (including the second device 104) in a first area being served by a first network device. However, there is a second network device, in close geographic proximity to the first network device, that could also serve some of the twenty devices. Accordingly, load balancing can be facilitated such that a subset of the twenty devices (including the second device 104) are notified to move within the service area of the network device. Thus, the first action can be movement of a subset of the devices and the second action can be load balancing within the communications network.

Continuing the above example, instead of the first action being physical movement of the devices (including the second device 104), another action can be implemented. For example, the devices could be in the service areas of both the first network device and the second network device (e.g., overlapping coverage area). Therefore, the first action can be for a subset of the mobile devices (including the second device 104) to hand off from the first network device to the second network device. Thus, the first action is communication handover of a subset of the devices from the first network device to the second network device and the second action can be load balancing within the communications network. It is noted that in this case, the notification can be between the first network device and the second network device, without implementation of the action (e.g., hand over) being implemented by the mobile device.

The transmitter/receiver component 110 can be configured to transmit to, and/or receive data from, the second device 104, other devices, other network devices, and/or other mobile devices. Through the transmitter/receiver component 110, the first device 102 can concurrently transmit and receive data, can transmit and receive data at different times, or combinations thereof. In a similar manner, the transmitter/receiver component 122 can be configured to transmit to, and/or receive data from, the first device 102, other devices, other mobile devices, and/or other network devices. Through the transmitter/receiver component 122, the second device 104 can concurrently transmit and receive data, can transmit and receive data at different times, or combinations thereof.

The at least one memory 112 can be operatively connected to the at least one processor 114. The at least one memory 112 can store executable instructions that, when executed by the at least one processor 114 can facilitate performance of operations. Further, the at least one processor 114 can be utilized to execute computer executable components stored in the at least one memory 112.

For example, the at least one memory 112 can store protocols associated with facilitating notification and corrective actions related to endpoint quality of service losses in advanced networks as discussed herein. Further, the at least one memory 112 can facilitate action to control communication between the first device 102, the second device 104, other devices, other mobile devices, and/or other network devices, such that the first device 102 can employ stored protocols and/or algorithms to achieve notification and corrective actions related to endpoint quality of service losses in a wireless network as described herein.

Further, the at least one memory 124 can be operatively connected to the at least one processor 126. The at least one memory 124 can store executable instructions that, when executed by the at least one processor 126 can facilitate performance of operations. Further, the at least one processor 126 can be utilized to execute computer executable components stored in the at least one memory 124.

For example, the at least one memory 124 can store protocols associated with facilitating notification and corrective actions related to endpoint quality of service losses in advanced networks as discussed herein. Further, the at least one memory 124 can facilitate action to control communication between the second device 104, the first device 102, other devices, other network devices, and/or other mobile devices, such that the second device 104 can employ stored protocols and/or algorithms to achieve notification and corrective actions related to endpoint quality of service losses in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 114 can facilitate respective analysis of information related to facilitating notification and corrective actions related to endpoint quality of service losses in advanced networks. The at least one processor 114 can be a processor dedicated to analyzing and/or generating information received, a processor that controls one or more components of the first device 102, and/or a processor that both analyzes and generates information received and controls one or more components of the first device 102.

In addition, the at least one processor 126 can facilitate notification and corrective actions related to endpoint quality of service losses in advanced networks. The at least one processor 126 can be a processor dedicated to analyzing and/or generating information received, a processor that controls one or more components of the second device 104, and/or a processor that both analyzes and generates information received and controls one or more components of the second device 104.

Further, the term network device is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on.

In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

The various aspects provided herein provide benefits including, but not limited to, better user experience via improved reception and QoS across protocols. There is also provided more network planning intuitions (patterns both seasonal and movement). In addition, the disclosed aspects provide more efficient use of network resources by distributing the load (distribution of UEs at different network connectivity points) for better QoS and opportunistic use of all network coverage (motivate movement away from cell edge). Also provided is better utilization of all frequency bands by determining alternate QoS performance and suggesting switches based on user and network need to improve efficacy and stability of cloud-based autonomous vehicles (maintaining their path in a high QoS). In addition, for first responder and emergency situations, the disclosed aspects allow instantaneous switching between best frequency band for important QoS, such as for advanced application of emergency response (e.g., FirstNet) prioritization. Accordingly, first responders (e.g., law enforcement, fire department personnel, medical personnel, and so on) can be provided priority communications with increased QoS levels.

Figure 2:
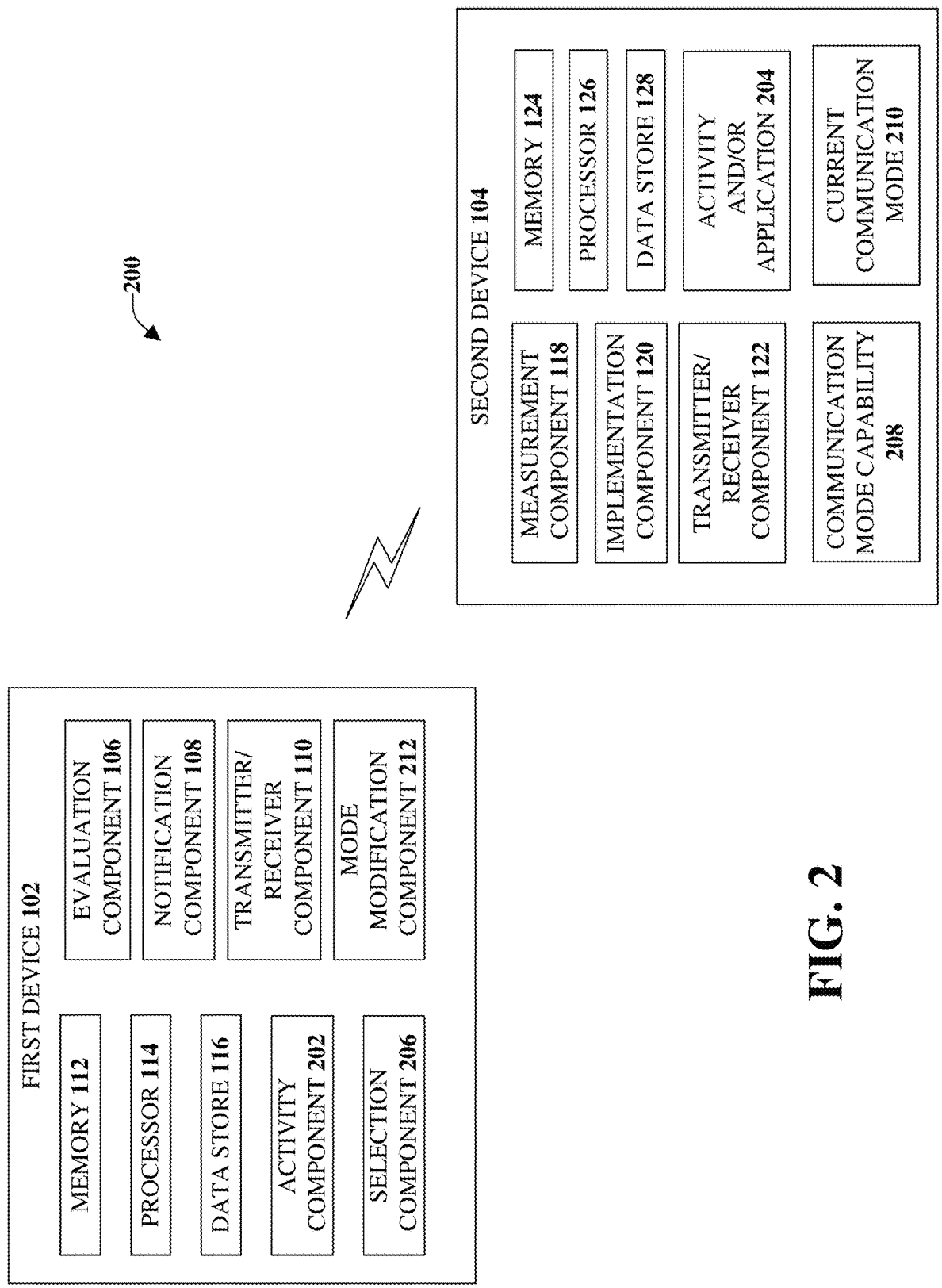
FIG. 2 illustrates an example, non-limiting, system that facilitates an action to improve a quality of service based on an application executing on a device in accordance with one or more embodiments described herein.

FIG. 2 illustrates an example, non-limiting, system 200 that facilitates an action to improve a quality of service based on an application executing on a device in accordance with one or more embodiments described herein. Repetitive description of like elements employed in other embodiments described herein is omitted for sake of brevity. The system 200 can comprise one or more of the components and/or functionality of the system 100 and vice versa.

As illustrated, an activity component 202 can determine an activity and/or application 204 executing on the second device 104. For example, the activity and/or application 204 can be a time sensitive activity/application or a non-time sensitive activity/application. The occurrence of the trigger event can be changeable based on an activity and/or an application determined to be occurring (executing) at the device.

For example, the activity component 202 can determine the activity and/or application 204 is a non-time sensitive application (e.g., a voice call, a short message session (SMS), a text exchange, and so on). In this case, a selection component 206 can select the first action as a physical movement of the device from a first location to a second location. The corresponding second action can be related to a change in a voice quality within the communication network.

According to some implementations, the first action can be determined based on a communication mode capability 208 of the second device 104 and a current communication mode 210 being utilized by the second device 104. For example, communication modes can include, but are not limited to, cellular communication, Wi-Fi communication, Bluetooth communication, LTE communication, 5G communication, and so on. A mode modification component 212 can evaluate whether changing from the current communication mode 210 to another communication mode that the device is capable of using would increase the QoS level to satisfy the defined threshold quality level. If so, the mode modification component 212 can cause the notification component 108 to send an instruction to the second device 104 to change to a different communication mode. For example, the notification component 108 can send an instruction for the second device 104 to change its communication mode from a first communication mode to a second communication mode, different from the first communication mode.

Alternatively, the activity component 202 can determine the activity and/or application 204 is a time sensitive application (e.g., an augmented reality activity, streaming video, gaming, and so on). In this case, the selection component 206 can select the first action as a physical movement of the device from a first location to a second location within the communications network. The corresponding second action is related to reduction of a latency within the communication network.

The first device 102 can send the notification (e.g., via the notification component 108 and/or the transmitter/receiver component 110) to the second device 104. The notification can be sent in order to facilitate a first action at the second device 104. In some implementations, in order to facilitate the first action, the recommended action can be output at the second device 104 in any perceivable format. The output at the second device 104 can be a suggested navigation from a first location to a second location within the communication network. For example, audio can be output at the second device 104 instructing the user where to move the device in order to improve the QoS (e.g., to make the call, the view the video, and so on). In another example, a visual rendering can be output, such as on a display or screen of the second device 104 as one or more endpoint QoS visualizations. In an example, the output can be a QoS predictive map (e.g., a heat map) or a QoS predictive navigation map, or another rendering. Examples of such renderings will be provided with respect to FIGS. 4 and 5 below.

According to some implementations, the activity and/or application can be related to an emergency response. For example, the activity can be an active emergency situation and the application can be an application associated with emergency response user (e.g., the second device 104 is associated with an emergency responder). With first responders (or another preemptive prioritization of users), the system 200 can utilize QoS expectations and deliberately cause QoS loss for standard (e.g., non-emergency responder) users in exchange for preemption. Thus, the devices associated with the emergency responders will have priority at the expense of devices associated with non-emergency responders in the area.

Figure 3:
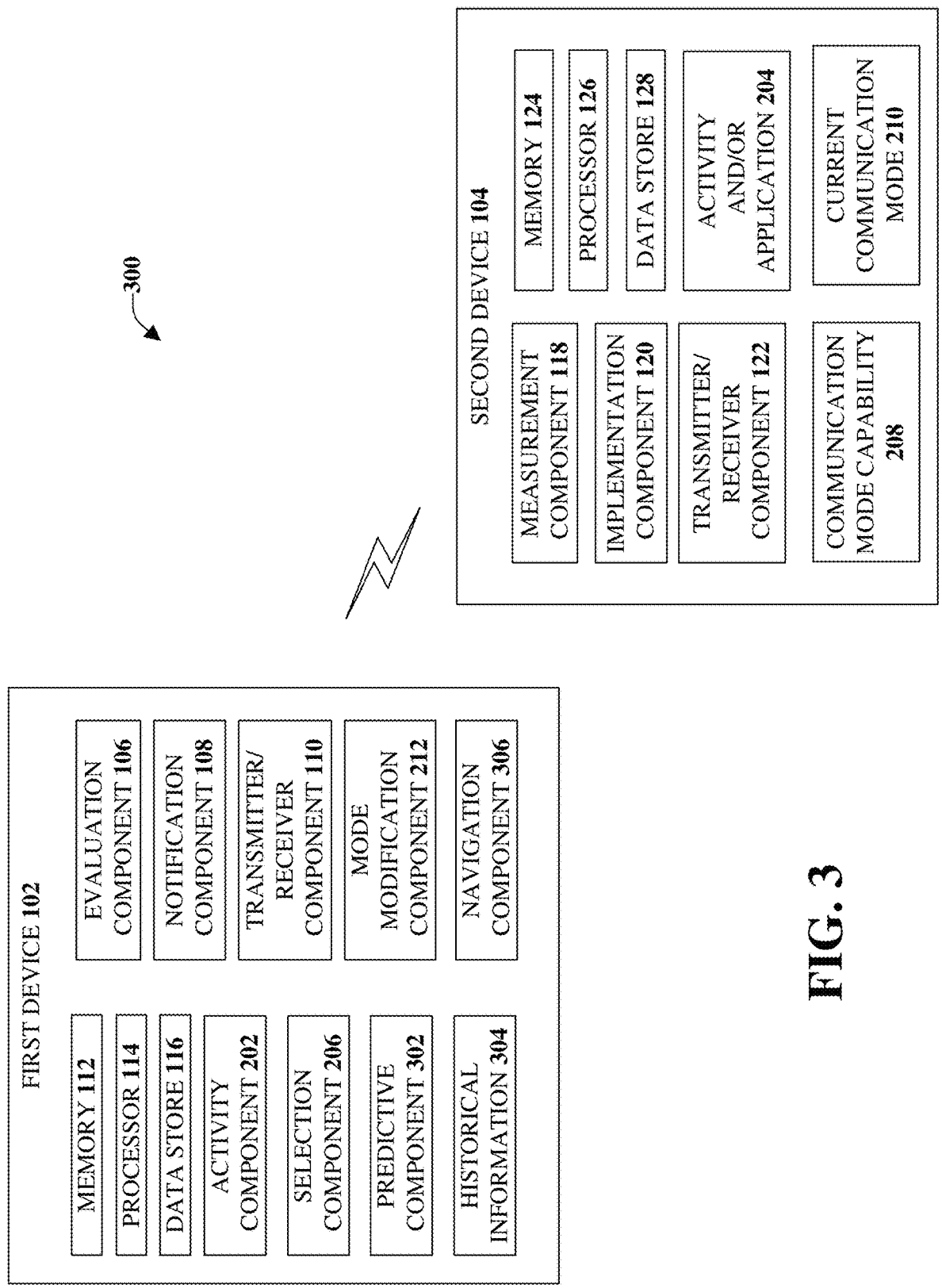
FIG. 3 illustrates an example, non-limiting, system that facilitates an action to improve a quality of service based on predictions of quality of service levels within a communications network in accordance with one or more embodiments described herein.

FIG. 3 illustrates an example, non-limiting, system 300 that facilitates an action to improve a quality of service based on predictions of quality of service levels within a communications network in accordance with one or more embodiments described herein. Repetitive description of like elements employed in other embodiments described herein is omitted for sake of brevity. The system 300 can comprise one or more of the components and/or functionality of the system 100, the system 200, and vice versa.

A prediction component 302 can make one or more predictions related to a future QoS level in various geographic areas of the communications network based on historical information 304. The historical information 304 can be retained in the at least one memory 112, the at least one data store 116, or another component of the first device 102. According to some implementations, the historical information can be retained external to the first device 102 and accessible by the first device 102. The historical information 304 can include, for example, information related to measured QoS at various locations within the communications network, actions implemented within the communications network to improve a QoS level, network congestions conditions at the various locations, weather information, seasonal variations affecting the QoS levels, and so on.

Based, at least in part, on the historical information 304, the prediction component 302 can provide information indicative of the expected QoS levels at various locations within the communications network. According to some implementations, the prediction component 302 can make the prediction based on both the historical information 304, current information, and expected future information. For example, if there is a large event or gathering of people expected at a location on a data certain, the expected network congestion at that time and place can be considered by the prediction component 302. Alternatively, or additionally, if a weather condition (e.g., a thunderstorm) is expected that can impact the QoS level, such future weather conditions can be considered by the prediction component 302.

A navigation component 306 can associate QoS to one or more locations based on the prediction received from the prediction component 302. The navigation component 306 can output suggestions as to where the second device 104 should be moved. For example, the navigation component 306 can provide a first indication where a QoS improvement can be achieved based on movement now. A second indication can be provided by the navigation component 306 with an indication of where QoS can be improved in the near future based on movement to that location. In another example, a third indication can be provided by the navigation component 306 to indicate where QoS can be improved now with an alternative endpoint (e.g., a change in a communication mode). In another example, the navigation component 306 can provide a fourth indication where QoS is expected to improve (or degrade) in the near future based on weather predictions.

According to some implementations, usage of QoS loss and expected power performance can be analyzed by the navigation component 306 to forbid traversal into certain locations and/or activity of certain endpoints. For example, there can be a need to survive (e.g., remain operational with sufficient power and QoS) for three hours such that the first device 102 cannot move out of a good coverage area. Further, a user interface (UI) layer can be provided that shows navigation, predicted potential problems, and/or haptic feedback for navigation.

In accordance with some implementations, the first action can be to apply instantaneous and/or dynamic directional beam forming for Radio Frequency (RF) formulation. In some implementations, the user of expected QoS loss and typical UE population in an area can be utilized to dynamically formulate (and migrate) 5G slice with specific performance parameters.

The navigation component 306 can, in some implementations, complement traffic patterns or user navigation predictions of movement for better QoS both from user inspired movement and automated systems. This can facilitate movement of a single UE and/or multiple UEs for better QoS.

In some cases, improved network planning for QoS determination can be facilitated. For example, layer management (e.g., advanced 5G transient slices), tower and network node placement, optimization of plane and beam forming algorithms can be implemented by the system 300. Further, the navigation component or another system component can facilitate dynamic meshing of devices to find and utilize best signal (both across different network protocols and among a similar protocol).

According to some implementations, collaboration among devices can be utilized. For example, devices can learn from one other. This optional collaboration can include devices trying to mesh together to share proximal information. For example, imagine a mesh or a blanket. At one edge or corner a device notices there is a potential error and that device can ask the network or adjacent devices whether they also see the error. Then, proscriptively the devices can decide what to do after that. Thus, the devices can communicate with one another to determine if a large number of the devices are experiencing the same situation. The network can do the same thing. For example, if the device is experiencing an event, the network can ask other devices if they are experiencing the event also. In some implementations, devices can receive signal strength from other devices by forming a mesh or other type of network.

Figure 4:
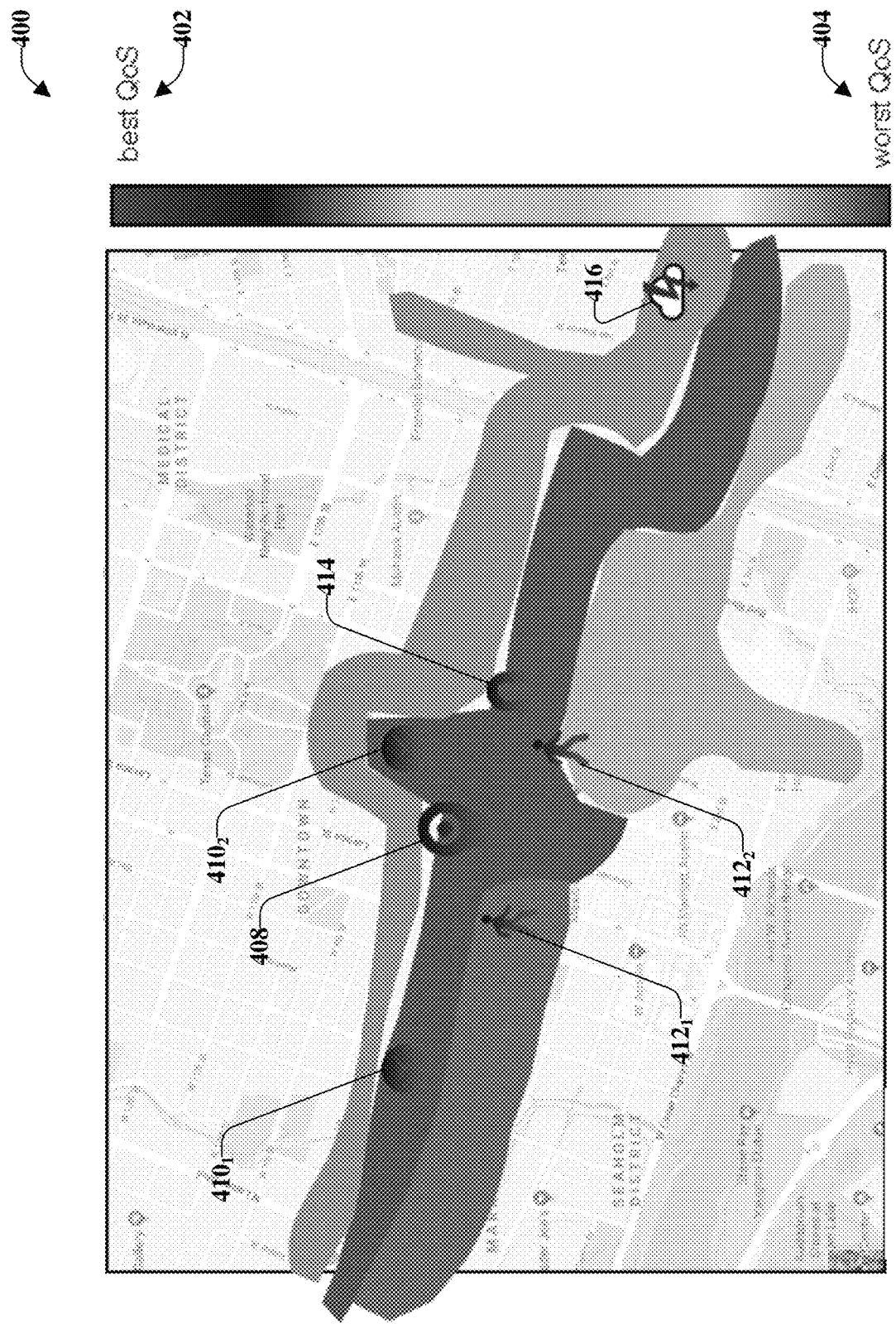
FIG. 4 illustrates an example, non-limiting, representation of an electronic map in accordance with one or more embodiments described herein.

FIG. 4 illustrates an example, non-limiting, representation of an electronic map 400 in accordance with one or more embodiments described herein. The electronic map can be a quality of service predictive map according to some implementations. As illustrated, there can be shading on the electronic map 400, wherein the grades of shading (or coloring in some cases) indicates the locations that are measured to currently have a best QoS 402 through a worst QoS 404, as indicated by the scale 406 on the right hand side of FIG. 4 (although the scale can be located anywhere relative to the map). In some cases, the scale can be overlaid on the map and/or the predicted QoS can be text that displays when a pointing device is hovered over a location on the electronic map 400.

In further detail, a current user location 408 can be indicated. Locations wherein a QoS improvement in the near future is expected are also illustrated at $410_1$ and $410_2$. In addition, illustrated are a first location $412_1$ and a second location $412_2$ where a QoS improvement can be achieved now based on physical movement of the device. Further, another location 414 is illustrated that indicates QoS can be improved now with an alternate endpoint (e.g., change of communication mode). In addition, illustrated is a location 416 where a QoS loss is expected to occur soon based on weather predictions. It is noted that the electronic map 400 and various locations on the map are for illustrative purposes only and the disclosed aspects are not limited to this particular type of electronic map nor the visual representations provided on the electronic map.

Figure 5:
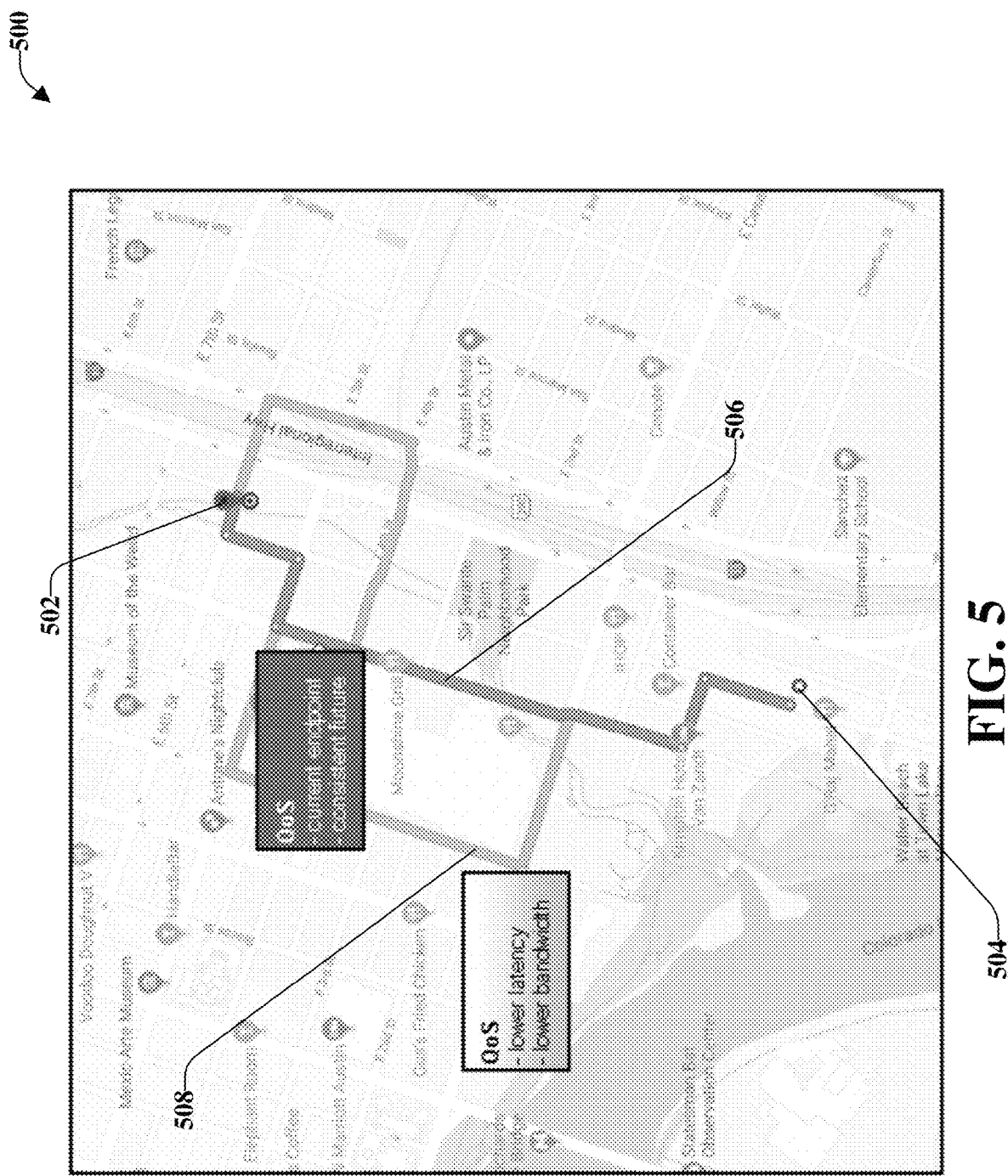
FIG. 5 illustrates another example, non-limiting, representation of an electronic map in accordance with one or more embodiments described herein.

FIG. 5 illustrates another example, non-limiting, representation of an electronic map 500 in accordance with one or more embodiments described herein. The electronic map can be a quality of service predictive navigation map according to some implementations. As illustrated, the electronic map 500 can indicate an area around a current location 502 of the user and a destination 504 of the user. To traverse from the current location 502 to the destination 504, alternative routes can be presented to the user.

For example, a first route 506, depicted by the darker navigation line, can provide the user with a QoS that utilizes a current endpoint and that is expected to be consistent in the future (e.g., during the travel time from the current location 502 to the destination 504). Also illustrated is a second route 508, depicted by the lighter colored navigation line (although color or another manner or distinguishing between the different routes can be utilized). The second route 508 can be traversed, although it is expected that the second route 508 will have a QoS with a lower latency and a lower bandwidth. However, the user might decide to traverse the second route 508 for other reasons (e.g., walk with a friend that is at a location on that route, stop at a bank or store on that route, and so on). It is noted that although only two alternative routes are illustrated and described, any number of alternative routes can be provided with the disclosed aspects.

Figure 6:
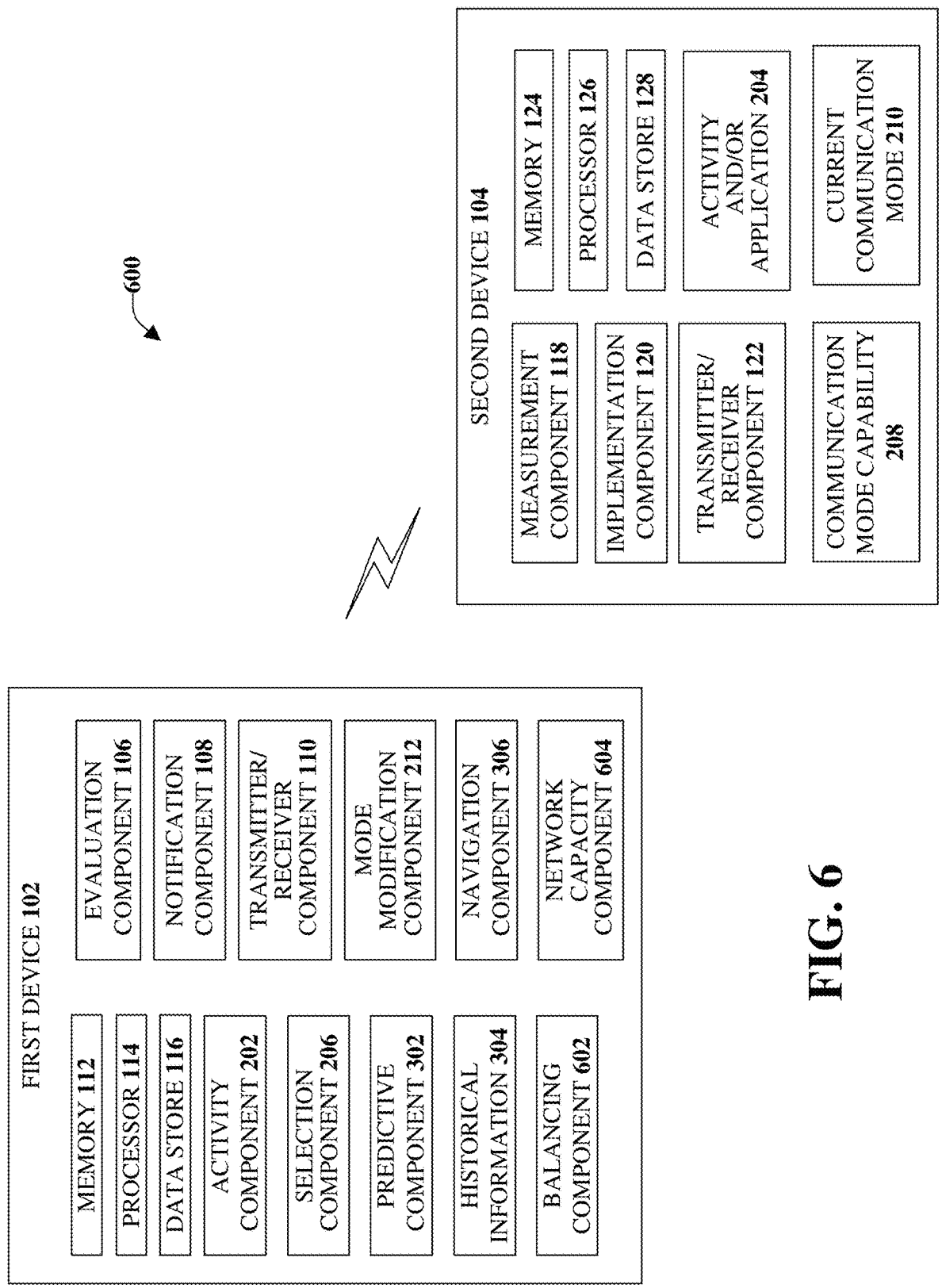
FIG. 6 illustrates an example, non-limiting, system that facilitates various actions related to improvement of a quality of service of a wireless communications network in accordance with one or more embodiments described herein.

FIG. 6 illustrates an example, non-limiting, system 600 that facilitates various actions related to improvement of a quality of service of a wireless communications network in accordance with one or more embodiments described herein. Repetitive description of like elements employed in other embodiments described herein is omitted for sake of brevity. The system 600 can comprise one or more of the components and/or functionality of the system 100, the system 200, the system 300, and vice versa.

A balancing component 602 can determine whether a quality of service level in a communications network can be improved based on balancing a network traffic load within the communications network. For example, there can be a group of devices within the network that are utilizing a first network device. Thus, the first network device can be handling a first amount of network traffic. Further, there can be at least a second network device within the network that is available to handle some, or all, of the network traffic of the devices. Accordingly, the balancing component 602 can determine that there would be a better quality of service for the devices if the network traffic load was spread more evenly between the two or more network devices. Based on this, the balancing component 602 can provide an indication to one or more devices such that devices of the first group of devices are handed off from the first network device to the second network device.

According to some implementations, the first action can be related to deployment of one or more mobile network devices within the communications network. Accordingly, a network capability component 604 can determine whether additional network devices should be deployed in the communications network. If such additional network devices should be deployed, the network capability component 604 can provide an indication of the number of additional network devices that should be deployed and respective locations for the network devices. Upon or after the deployment of the one or more network devices, the deployed network devices can be added to the group of network devices, at least temporarily. In some implementations, the system 600 can predict QoS loss and move the endpoint instead of the UE.

In some implementations, environment sensitive dynamic adaptation of decisions based on prediction with historical data (e.g., the historical information 304) on run-time environment can be facilitated. For example, a determination can be made (e.g., by the prediction component 302) as to how actions that work be prescribed to multiple UEs for the same solution. Alternatively, a determination can be made whether they be deferred or redirected based on those individual UE/users.

According to some implementations, the disclosed aspects can provide a new use for autonomous navigation and placement. According one or more devices can sustain QoS better as the device moves around. Alternatively, the device can alter course based on the needed QoS level. This can be applied to devices associated with, for example, autonomous vehicles and instantaneous needs. For example, do not allow self-driving car or pizza delivery robot go into a "dead zone" in order to retain connectivity.

Figure 7:
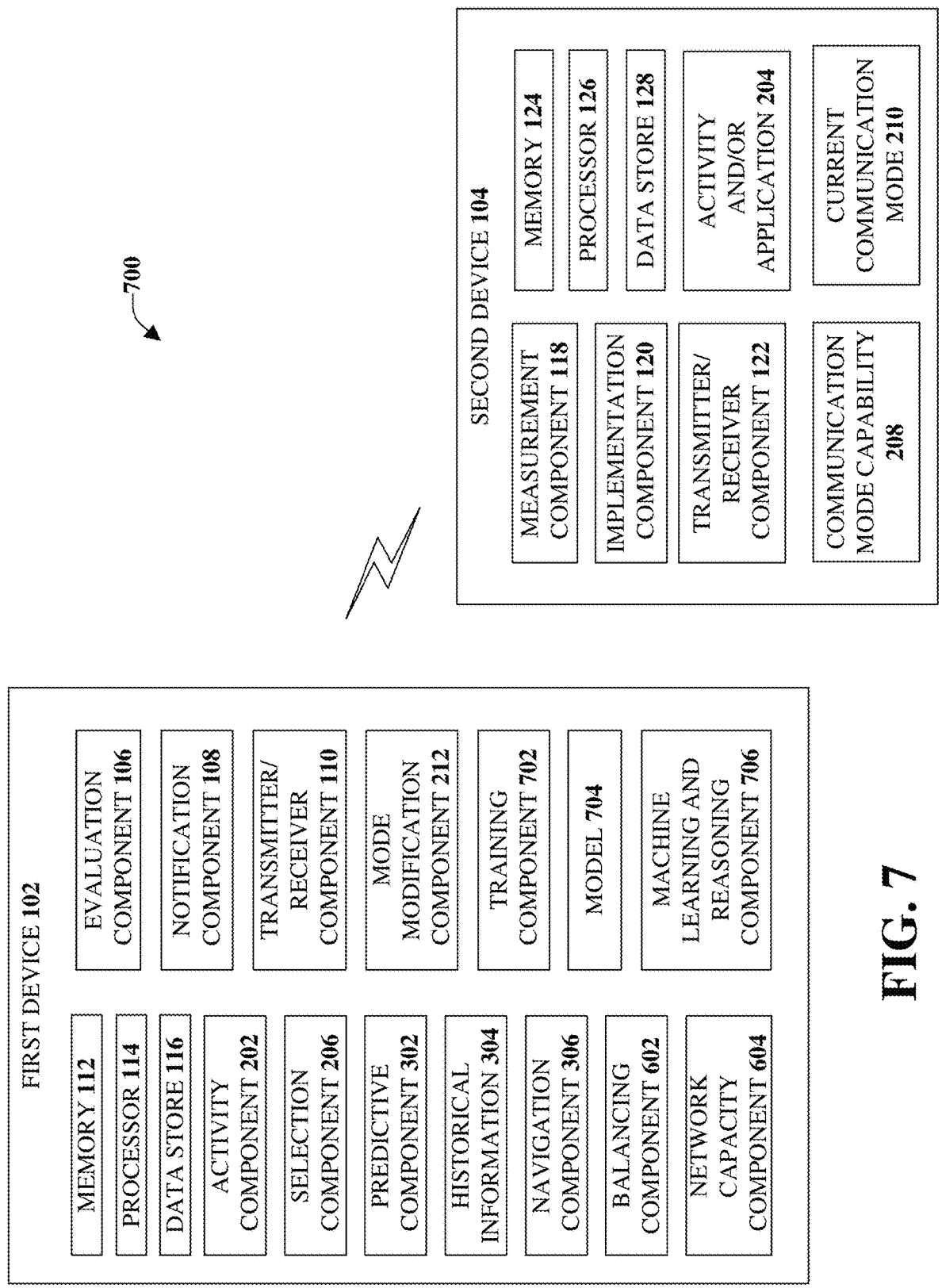
FIG. 7 illustrates an example, non-limiting, system that trains a model and employs automated learning to facilitate one or more of the disclosed aspects in accordance with one or more embodiments described herein.

FIG. 7 illustrates an example, non-limiting, system 700 that trains a model and employs automated learning to facilitate one or more of the disclosed aspects in accordance with one or more embodiments described herein. Repetitive description of like elements employed in other embodiments described herein is omitted for sake of brevity. The system 700 can comprise one or more of the components and/or functionality of the system 100, the system 200, the system 300, the system 600, and vice versa.

As illustrated, the system 700 can comprise a training component 702 that can train a model 704. For example, the training component 702 can train the model 704 on trigger events and actions that have been determined to have resolved the trigger events. The model 704 can be trained, by the training component 702, to detect and resolve the trigger events to a defined confidence level.

For example, inputs to the model 704 can include the trigger events and external and internal conditions associated with the trigger events, including weather conditions. Additional inputs can include possible actions, including alternative actions, that can be employed to resolve the trigger events. For example, if the trigger event has caused the QoS level for the second device 104 to degrade below a threshold QoS level, the model 704 can be trained, by the training component 702, to implement one or more of the actions to cause the QoS level to increase above the threshold QoS level.

The system 700 can also comprise a machine learning and reasoning component 706 that can be utilized to automate one or more of the disclosed aspects. The machine learning and reasoning component 706 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 706 can employ principles of probabilistic and decision theoretic inference. Additionally, or alternatively, the machine learning and reasoning component 706 can rely on predictive models constructed using machine learning and/or automated learning procedures. Logic-centric inference can also be employed separately or in conjunction with probabilistic methods.

The machine learning and reasoning component 706 can infer implementation of one or more actions that should be taken based on a QoS level within a communications network. Based on this knowledge, the machine learning and reasoning component 706 can make an inference based on which actions to implement.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific condition, modification, and/or effect, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating notification and corrective actions related to endpoint quality of service losses) can employ various artificial intelligence-based schemes for carrying out various aspects thereof. For example, a process for determining if a particular action should be taken based on a comparison between current conditions and historical conditions and outcomes can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what action to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by retaining a database of triggers, historical changes, and impacts). For example, SVMs can be configured through a learning or training phase within a classifier constructor and feature selection module. Thus, a classifier(s) can be used to automatically learn and perform a number of functions, including but not limited to referring to the historical information for the implementation of change decisions in subsequent processing cycles, facilitating more precise individual adjustments and desired results with fewer iterations (only one physical movement rather than two or more), and so forth.

As discussed herein, the various aspects relate to the modernization of the QoS indicators on UEs through the use of Artificial Intelligence (and Machine Learning and Reasoning-based predictions) as well as engaging more natural navigation and guidance options for the user. There can be various action characterizations for correcting QoS losses. For example, actions can include, but are not limited to moving or guiding the UE (and user) to an area of performance with respect to a UE device (e.g., user) preferred state and context. According to some implementations, the model can be trained to create and predict ideal QoS loss solutions. The decisions can be related to learning and predicting QoS loss with respect to known UEs being in an area over specific time and endpoint needs. Further, the disclosed aspects provide a novel visualization for best endpoint QoS. Such guidance can provide predicted locations of better service and can also provide predictions for endpoint (application or network) QoS by location and time.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 8:
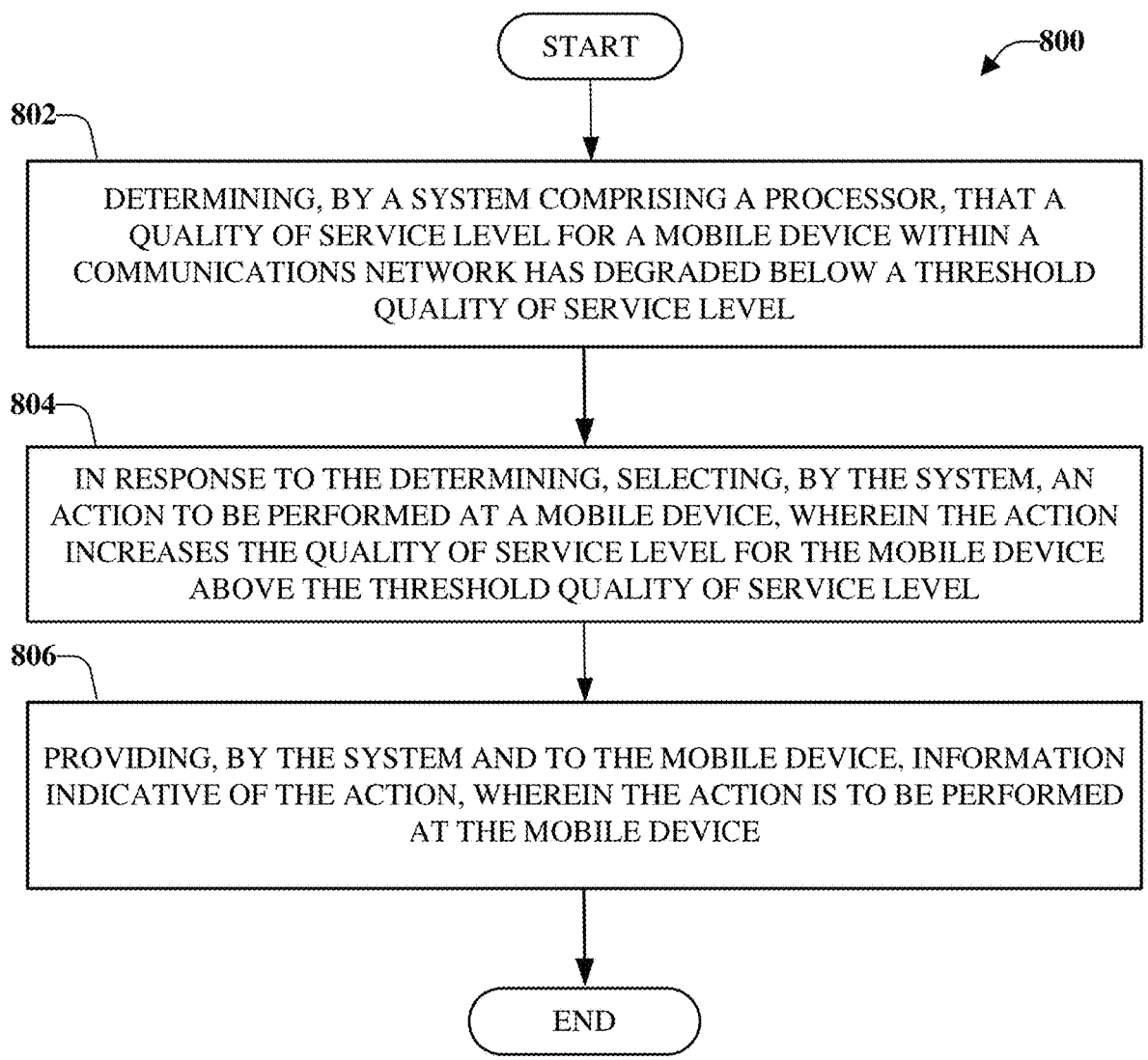
FIG. 8 illustrates a flow diagram of an example, non-limiting, computer-implemented method for facilitating notification and corrective actions related to endpoint quality of service losses in advanced networks in accordance with one or more embodiments described herein.

FIG. 8 illustrates a flow diagram of an example, non-limiting, computer-implemented method 800 for facilitating notification and corrective actions related to endpoint quality of service losses in advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a machine readable or computer readable storage device comprising executable instructions that, in response to execution, cause a system comprising a processor to perform operations, which can be operations discussed with respect to the computer-implemented method 800 and/or other methods discussed herein.

The computer-implemented method 800 starts, at 802, when a determination is made that a quality of service level for a mobile device within a communications network has degraded below a threshold quality of service level (e.g., via the evaluation component 106). For example, the determination can be made based on information received from the mobile device. The information can be indicative of a QoS level within the communications network.

At 804 of the computer-implemented method 800, an action to be performed at the mobile device can be selected (e.g., via the selection component 206). The action can be selected in response to the determining at 802. Further, the action can be selected to increase the quality of service level for the mobile device above the threshold quality of service level. The action can be, for example, a physical movement of the device.

According to some implementations, the action can be selected based on a first communication mode of the mobile device. The first communication mode can be utilized by the mobile device to communicate with other devices. Further, a second communication mode can be selected for use by the mobile device to communicate with the other devices.

Information indicative of the action can be provided to the mobile device, at 806 of the computer-implemented method 800 (e.g., via the transmitter/receiver component 110). According to some implementations, providing the information indicative of the action can comprise facilitating an output, at the mobile device, of an electronic mapping application that indicates alternative navigation routes.

The action can be an action to be performed at the mobile device. However, according to some implementations, the action can be performed elsewhere in the communications network. For example, the action can be deployment of one or more network devices within the communications network. The deployment of the one or more network devices can be a temporary deployment (e.g., during an emergency situation, during an unplanned event, during a planned event, and so on).

Figure 9:
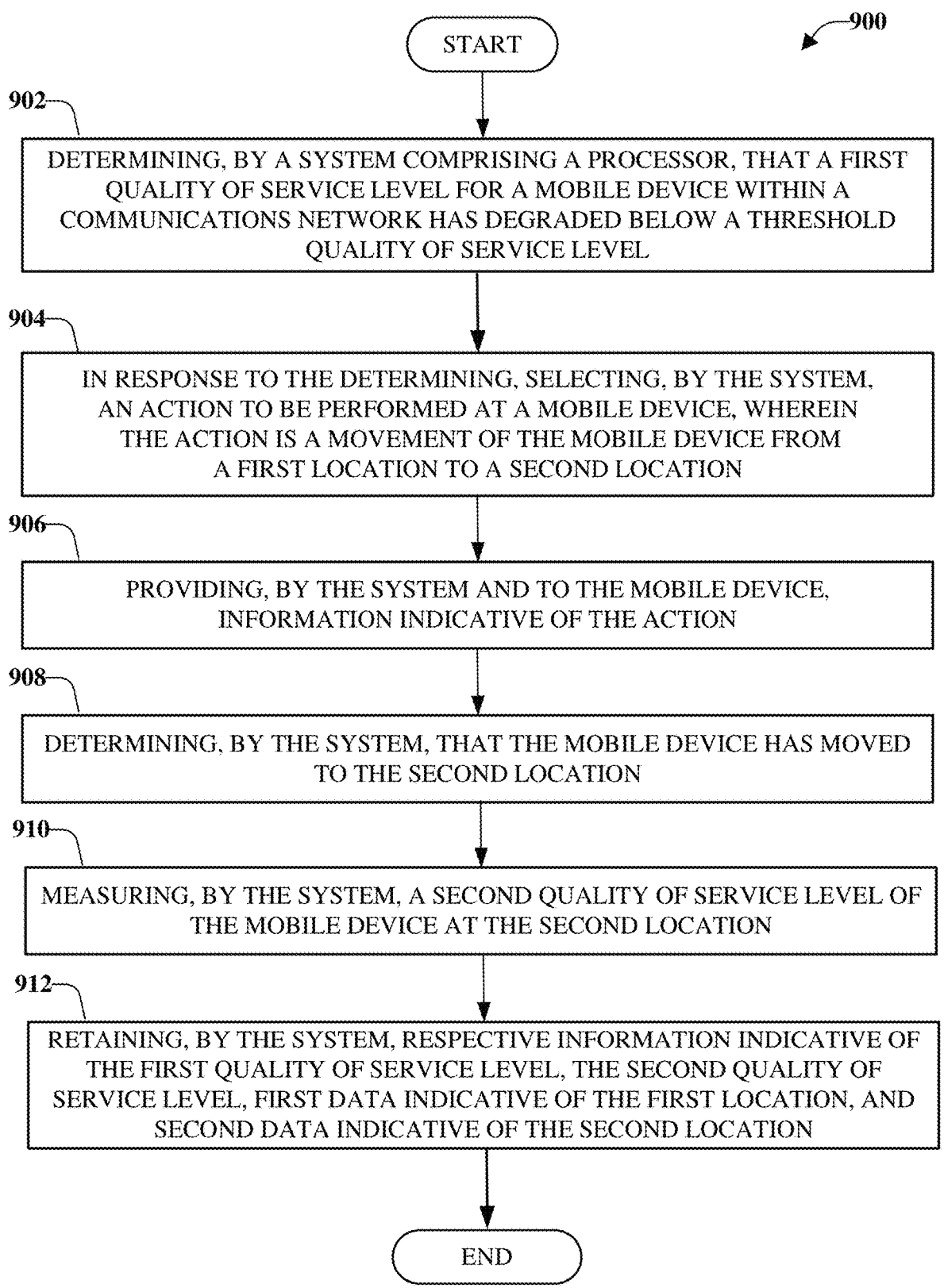
FIG. 9 illustrates a flow diagram of an example, non-limiting, computer-implemented method for facilitating notification and corrective actions related to endpoint quality of service losses in advanced networks in accordance with one or more embodiments described herein.

FIG. 9 illustrates a flow diagram of an example, non-limiting, computer-implemented method 900 for facilitating notification and corrective actions related to endpoint quality of service losses in advanced networks in accordance with one or more embodiments described herein. Repetitive description of like elements employed in other embodiments described herein is omitted for sake of brevity.

At 902 of the computer-implemented method 900, a determination is made that a first QoS level for a mobile device within a communications network has degraded below a threshold quality of service level (e.g., via the evaluation component 106). Based on the determination, at 904, an action to be performed at the mobile device is selected (e.g., via the selection component 206). As an example, the action selected can be a movement of the mobile device from a first location to a second location. Further, at 906, information indicative of the action is provided to the mobile device (e.g., via the transmitter/receiver component 110).

At 908, a determination can be made that the device has moved to the second location (e.g., via the measurement component 118 or another system component). For example, the determination can be made based on data received from the mobile device or based on other information, such as specific location information from the mobile device. According to some implementations, the mobile device can provide an indication when the action is completed. For example, the mobile device (or other device that is performing the action) can reply with a notification that the action has been completed.

Upon or after the mobile device has completed the action (e.g., moved to the second location in this example), a second QoS level of the mobile device at the second location can be measured, at 910 (e.g., via the measurement component 118). To second QoS level can be the same as the first QoS level, worse than the first QoS level, or better than the first QoS level. If the QoS level is the same or worse, another action can be performed or revert to a state prior to the previous action. For example, if the action was a physical movement from a first location to a second location, the device can be moved to a third location, or moved back to the first location.

Respective information indicative of the first quality of service level, the second quality of service level, first data indicative of the first location, and second data indicative of the second location can be retained, at 912 (e.g., via the at least one data store 116). The respective information can be retained as historical information. The historical information can be utilized for a subsequent determination related to one or more actions to be performed related to a QoS level in a communications network. According to some implementations, the historical information can be utilized to train a model.

Figure 10:
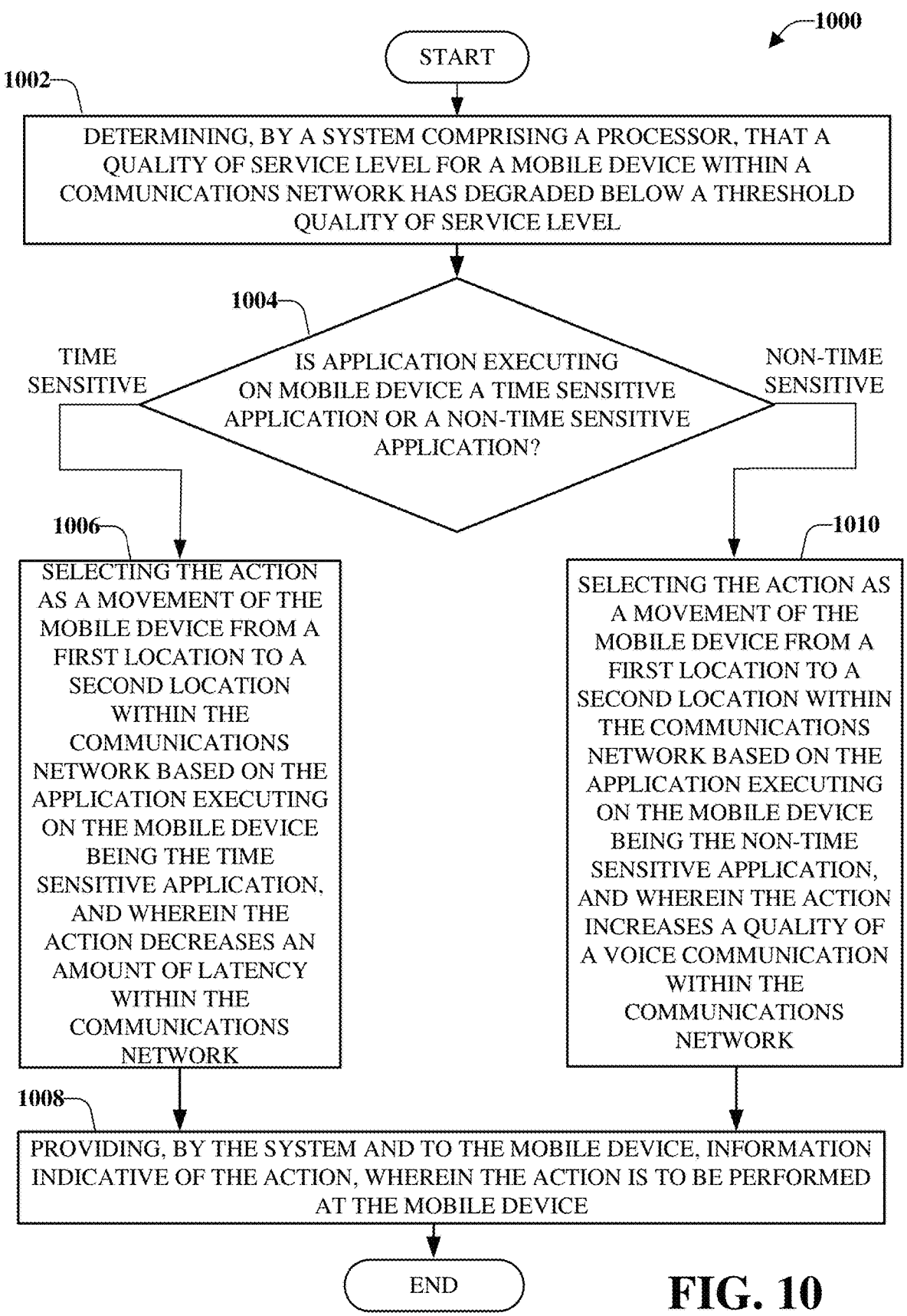
FIG. 10 illustrates a flow diagram of an example, non-limiting, computer-implemented method for facilitating management of a quality of service level experienced by a device based on an application executing on the device in advanced networks in accordance with one or more embodiments described herein.

FIG. 10 illustrates a flow diagram of an example, non-limiting, computer-implemented method 1000 for facilitating management of a QoS level experienced by a device based on an application executing on the device in advanced networks in accordance with one or more embodiments described herein. Repetitive description of like elements employed in other embodiments described herein is omitted for sake of brevity.

The computer-implemented method 1000 starts, at 1002, when a determination is made that a quality of service level for a mobile device within a communications network has degraded below a threshold quality of service level. For example, the threshold QoS level can be a level determined based upon a service level agreement or based upon other considerations.

At 1004, a determination is made whether an application executing on the mobile device is a time sensitive application or a non-time sensitive application. If the application is a time sensitive application, at 1006, the action is selected as a movement of the mobile device from a first location to a second location within the communications network. The action (e.g., the movement) is selected to decrease an amount of latency within the communications network based on the application being a time sensitive application. At 1008, the mobile device can be provided information indicative of the time action.

Alternatively, it the determination, at 1004, is that the application executing on the mobile device is a non-time sensitive application, at 1010, the action is selected as a movement of the mobile device from a first location to a second location within the communication. In this case the action (e.g., the movement) can increase a quality of a voice communication within the communications network. At 1008, the mobile device can be provided information indicative of the action to be performed.

Figure 11:
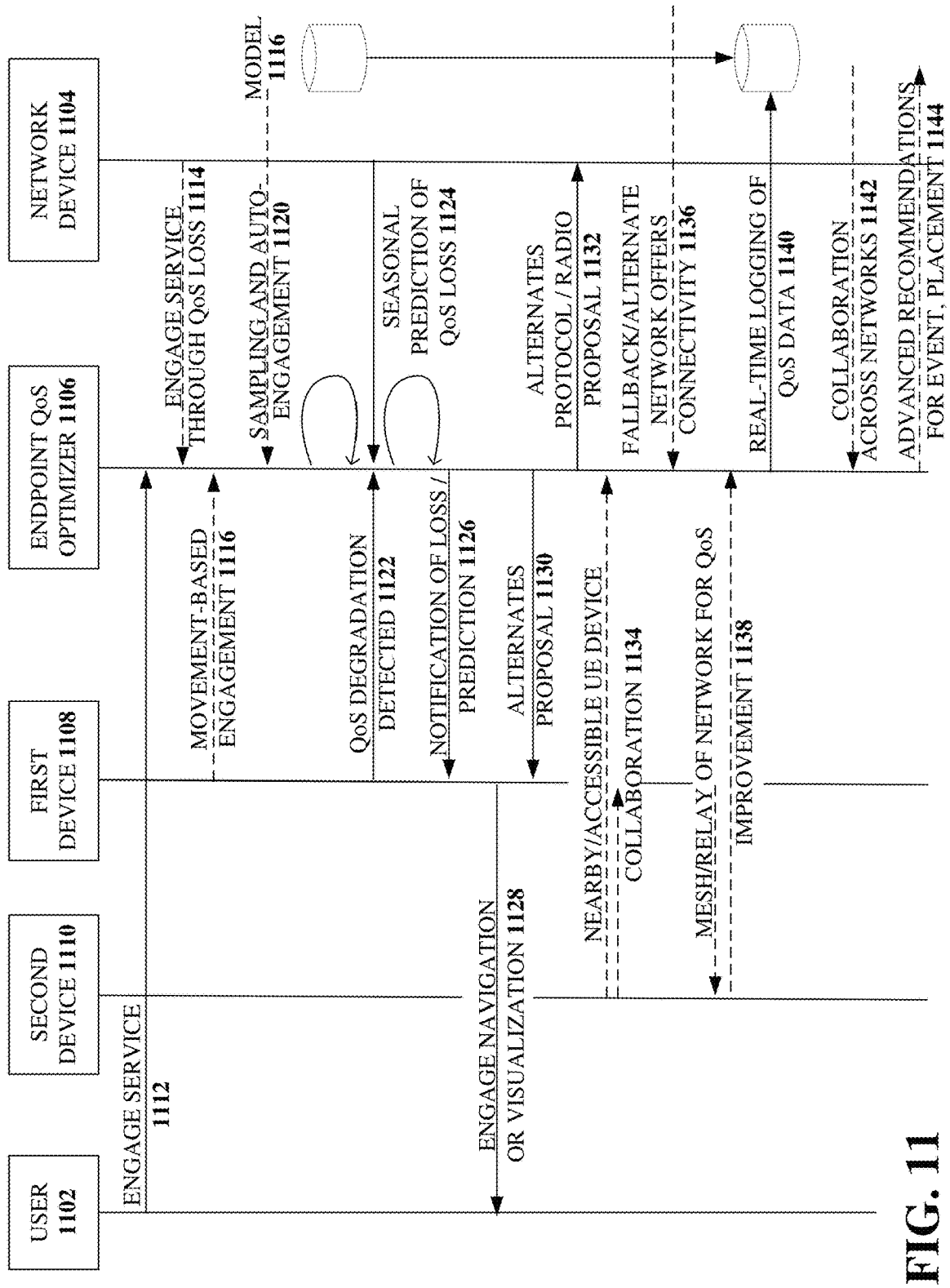
FIG. 11 illustrates an example, non-limiting, message sequence flow chart that can facilitate notification and corrective actions related to endpoint quality of service losses in advanced networks in accordance with one or more embodiments described herein.

FIG. 11 illustrates an example, non-limiting, message sequence flow chart 1100 that can facilitate notification and corrective actions related to endpoint quality of service losses in advanced networks in accordance with one or more embodiments described herein.

As illustrated, the message sequence flow chart 1100 represents a message sequence between a user equipment (UE) device 1102, a network device 1104 (e.g., a gNB), an endpoint QoS optimizer device 1106, a first device 1108, and a second device 1110. As used herein, the term "network device" can be interchangeable with (or can include) a network, a network controller or any number of other network components.

A service related to notification and corrective actions as discussed herein can be enable at 1112. For example, the endpoint QoS optimizer device 1106 can be engaged. The endpoint QoS optimizer device 1106 can be, but is not limited to, an application, a network device (or component thereof), or another service (e.g., cell phone signal, data strength, and so on) as something that needs updates.

According to optional implementations, the UE device 1102 and/or the endpoint QoS optimizer device 1106 can auto-activate the service. For example, the service can be auto-activated based on consecutive QoS losses, as indicated at 1114 and based on a determination that user satisfaction should be improved. In accordance with another optional implementation, the UE device 1102 and/or the endpoint QoS optimizer device 1106 can proactively activate the service based on movement and/or geofence, as indicated at 1116.

According to some implementations, the automatic and/or semi-automatic engagement of the service can be determined based on historical signal losses experienced by the UE device. In some implementations, the automatic and/or semi-automatic engagement of the service can be determined based on historical signal losses experienced across multiple UE devices (e.g., collaboration). For example, a model 1118 (e.g., the model 704) can be trained based on historical data (e.g., location, QoS information, applications being executed, and so on). Further, the model 1118 can perform sampling and auto-engagement of the service 1120, according to some implementations.

As indicated at 1122, the UE device 1102 and/or the endpoint QoS optimizer device 1106 can determine that there has been QoS degradation, which can be a trigger event. The trigger event can be suppressed or enhanced depending on an activity occurring at the UE device 1102 and/or an application executing on the UE device 1102. Information related to the trigger event can be selectively output. For example, the trigger event occurs, however, the trigger event is related to text connectively and, at the UE device 1102 the user is listening to music. Accordingly, there is no notification provided at the UE device 1102 related to the text connectivity loss because such notification is not applicable to the user. Alternatively, if the focus at the UE device 1102 is Augmented Reality (AR), the trigger event could be utilized to indicate the UE device 1102 should be moved to a location with higher latency (as compared to a latency of a current location) and without regard to a voice quality level at the location where the UE device 1102 is to be moved. According to additional, or optional, implementations, patterns related to QoS loss can be analyzed and expected occurrences of QoS loss based on such patterns can be predicated 1122. In an example, a seasonal prediction of QoS loss 1124 can be provided. For example, a prediction can be related to New York City during the holiday season or crowded zones for usage. The prediction can be used by users for navigation purposes and/or for path planning Notification of QoS loss can be provided, at 1126. For example, the notification can include information indicative of the occurrence of the QoS loss. Further, the notification can include other information indicative of a navigation and/or visualization, at 1128. For example, navigation can be triggered in order for the UE device 1102 (and user) to move from a first location to a second location (e.g., an alternate location). For example, an electronic map can be provided, such as the example map of FIG. 5. The second location can be a location expected to improve the QoS or mitigate the QoS loss. In an optional implementation, a heat map can be rendered for location (e.g., location mapping) for user-guided navigation. FIG. 4 illustrates an example of a heat map according to some implementations.

In another optional implementation, the UE device 1102 can be provided a prompt to switch to a different or alternate mode, at 1130. For example, the different or alternate mode can be a different endpoint or a lower but stable QoS with guidance. In yet another optional implementation, the UE device 1102 can be provided one or more warnings related to boundary condition (minimum/maximum) that can lead to QoS loss. In another example, alternatives related to a protocol and/or radio proposal 1132 can be provided.

In some cases, nearby and/or accessible UE devices can collaborate 1134 to provide information to one another regarding increasing a QoS level. For example, alternates can be proposed based on similar functionality. The system can converse, at 1136, with the endpoint QoS optimizer device 1106 to determine whether a fallback strategy should be utilized. For example, the fallback strategy can be another endpoint (e.g. Wi-Fi calling). In another, optional embodiment, for multiple accessible UE devices, the system can dynamically choose which UE device is to be activated with fallback (e.g. calling) from (or to), depending on activity. In yet another optional embodiment, multiple UE devices can combine, at 1138, to satisfy the endpoint need. For example, combining the multiple UE devices can form a mesh network, a relay, and so on.

Further, real-time (or near real-time) logging of QoS data can be performed, at 1140. The logging of QoS data can include QoS loss and usage data. The QoS data can be logged or stored in at least one data store (e.g., the at least one data store 116 or the at least one data store 128). According to some implementations, historical coupling of UE location and endpoint can be added. In an optional implementation, different endpoints (e.g., different service providers) can agree to collaborate, at 1142 with this data. Such collaboration across networks can improve a UE experience. Further, in some optional implementations, endpoints can proactively report historical QoS loss for planning, at 1144. For example, the planning can be related to similar events (e.g. concert) or cyclical timing (e.g., holiday season).

Described herein are systems, methods, articles of manufacture, and other embodiments or implementations that can facilitate notification and corrective actions related to endpoint quality of service losses in advanced networks. Facilitating notification and corrective actions related to endpoint quality of service losses can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 12:
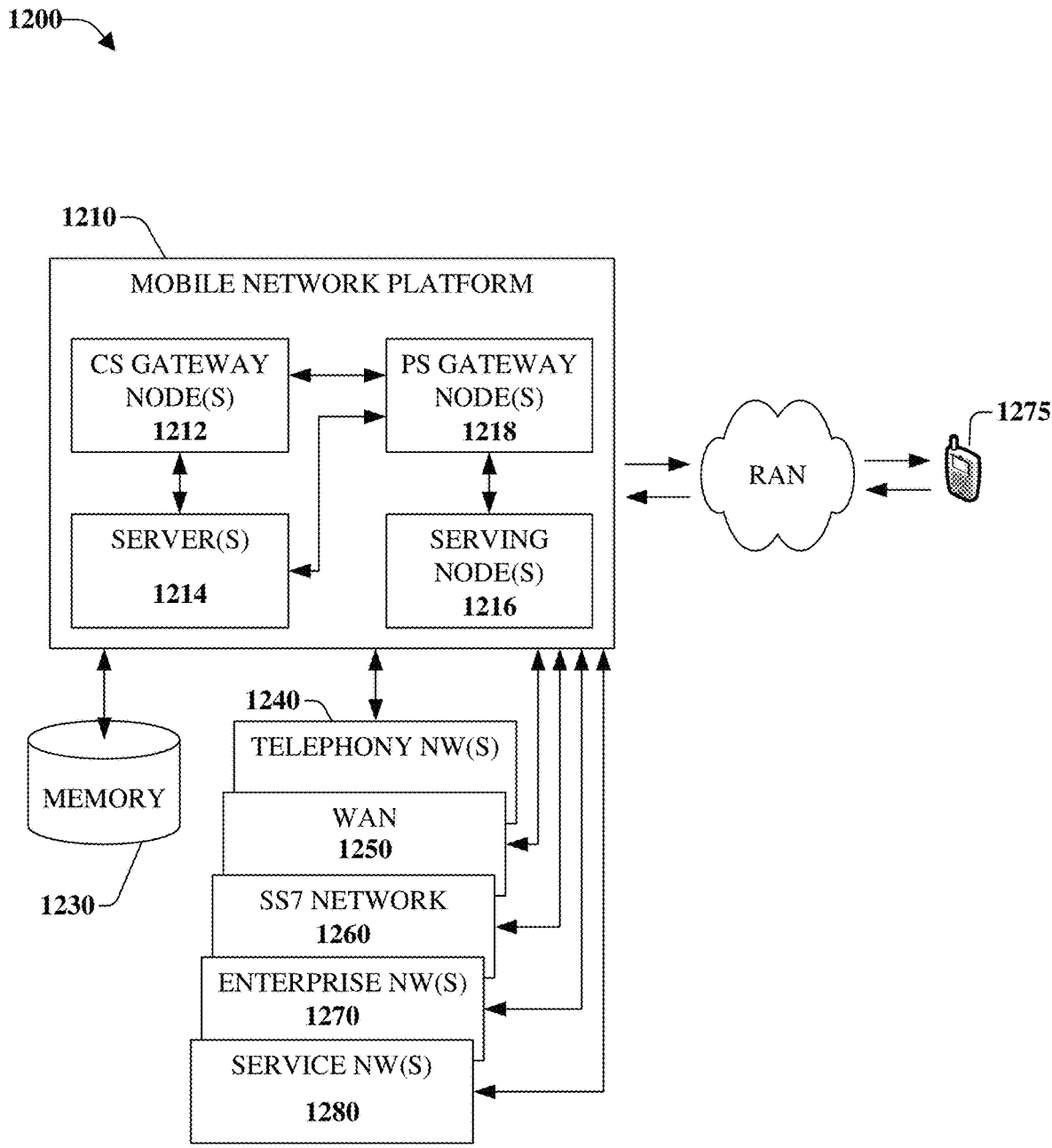
FIG. 12 illustrates an example block diagram of a non-limiting embodiment of a mobile network platform in accordance with various aspects described herein.

FIG. 12 presents an example embodiment 1200 of a mobile network platform 1210 that can implement and exploit one or more aspects of the disclosed subject matter described herein. Generally, wireless network platform 1210 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 includes CS gateway node(s) 1212 which can interface CS traffic received from legacy networks such as telephony network(s) 1240 (e.g., public switched telephone network (PSTN), or public land mobile network (PLMN)) or a signaling system #7 (SS7) network 1260. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication. Mobile network platform 1210 can also include the MMEs, HSS/PCRFs, SGWs, and PGWs disclosed herein.

In addition to receiving and processing CS-switched traffic and signaling, PS gateway node(s) 1218 can authorize and authenticate PS-based data sessions with served mobile devices. Data sessions can include traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) such as IP multimedia subsystem (IMS). Based on radio technology layer(s) available in technology resource(s) 1217, packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also includes serving node(s) 1216 that, based upon available radio technology layer(s) within technology resource(s) 1217, convey the various packetized flows of data streams received through PS gateway node(s) 1218. It is to be noted that for technology resource(s) 1217 that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1275.

It is to be noted that server(s) 1214 can include one or more processors configured to confer at least in part the functionality of macro network platform 1210. To that end, the one or more processor can execute code instructions stored in memory 1230, for example. It should be appreciated that server(s) 1214 can include a content manager 1215, which operates in substantially the same manner as described hereinbefore.

In example embodiment 1200, memory 1230 can store information related to operation of wireless network platform 1210. Other operational information can include provisioning information of mobile devices served through wireless network platform 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

Figure 13:
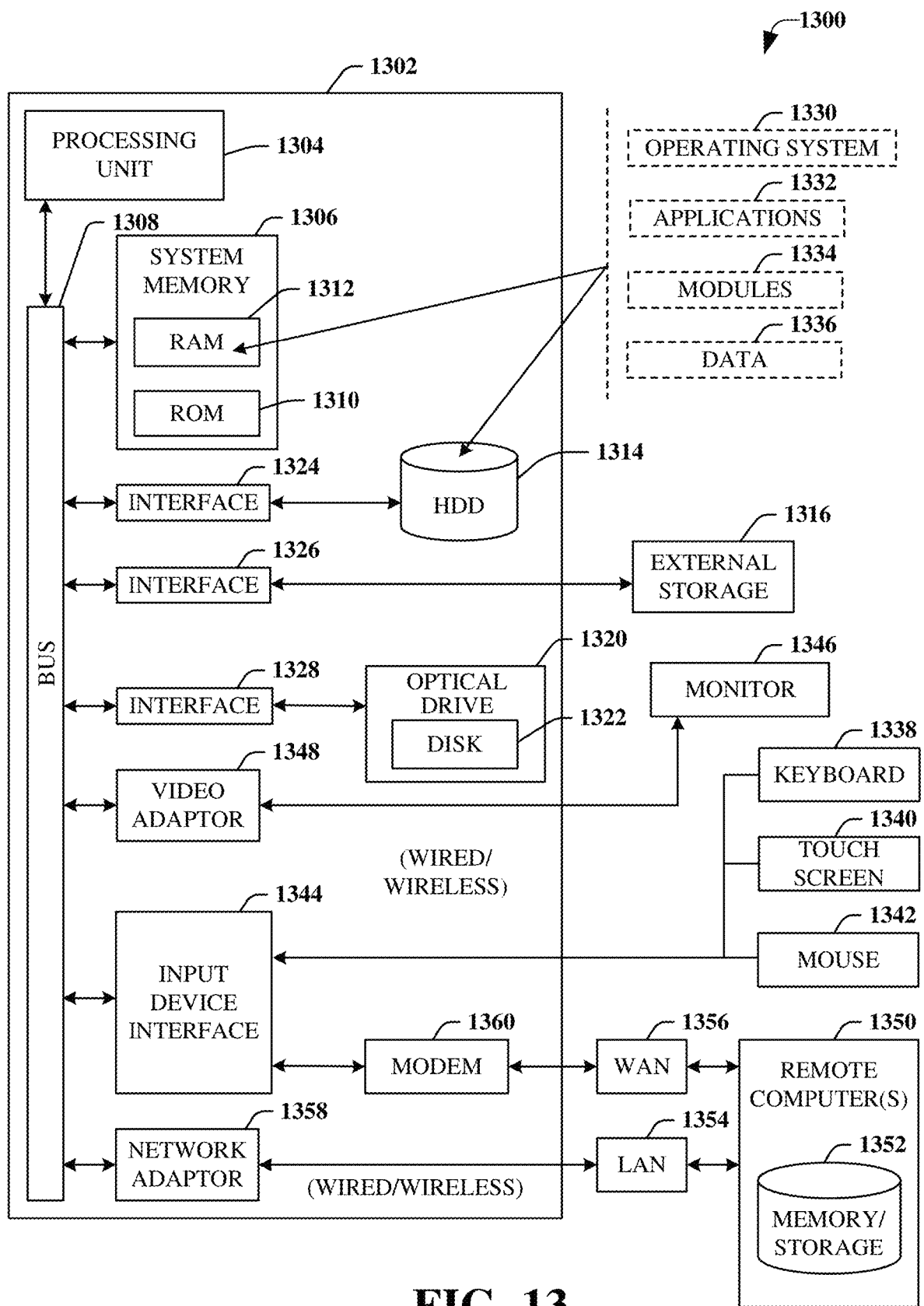
FIG. 13 illustrates an example block diagram of an example computer operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

According to some implementations, a machine-readable storage medium executable instructions that, when executed by a processor, facilitate performance of operations. The operations can comprise determining a trigger event has occurred. The trigger event can indicate a quality of service associated with a device fails to satisfy a defined quality of service level. The operations also can comprise ascertaining a type of application executing on the device. In addition, the operations can comprise determining that a movement of the device from a first location to a second location is expected to cause the quality of service associated with the device to satisfy the defined quality of service level Further, the operations can comprise facilitating an output, at the device, of information indicative of recommended routes from the first location to the second location.

Further to the above implementations, the first location can comprise a first latency amount and the second location can comprise a second latency amount. Thus, the operations can comprise selecting the second location based on the second latency amount being less than the first latency amount and based on the type of application executing on the device being categorized as a time sensitive application.

According to alternative, or additional, implementations, the first location can comprise a first voice quality level and the second location can comprise a second voice quality level. Thus, the operations can comprise selecting the second location based on the second voice quality level being a better voice quality than the first voice quality level and based on the type of application executing on the device being categorized as a non-time sensitive application.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an internal HDD 1314. The internal HDD 1314, external storage device(s) 1316 and optical disk drive 1320 can be connected to the system bus 1308 by an HDD interface 1324, an external storage interface 1326 and an optical drive interface 1328, respectively. The HDD interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for application programs 1332. Runtime environments are consistent execution environments that allow application programs 1332 to run on any operating system that includes the runtime environment. Similarly, operating system 1330 can support containers, and application programs 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
      predicting a future reduction in quality of service (QOS) for a device at a current location in a communication network, wherein the predicting is responsive to an expected crowding of communication devices at the current location; and
      in response to the predicting the future reduction in the QoS at the current location, activating a service related to notifications and corrective actions, wherein the service related to notifications and corrective actions comprises:
         predicting expected power performance of the device at a first plurality of locations within the communications network;
         analyzing the expected power performance to determine certain locations of the first plurality of locations, wherein movement of the device into the certain locations is forbidden;
         removing the certain locations from the first plurality of locations to determine a second plurality of locations;
         predicting future QoS values for the second plurality of locations within the communication network resulting in predicted future QoS values for the second plurality of locations within the communication network;
         determining a QoS threshold as a function of an application currently executing on the device, wherein the QoS threshold is to be compared to a current QoS provided to the device by the communication network; and
         responsive to the current QOS falling below the QoS threshold, providing a first notification of a first corrective action to the device, wherein the first corrective action is based at least in part on the predicted future QoS values for the second plurality of locations within the communication network.

2. The system of claim 1, wherein the determining the QoS threshold comprises determining the QoS threshold based at least in part on a type of the application currently executing on the device.

3. The system of claim 2, wherein the operations further comprise:
   determining the type of the application currently executing on the device is an augmented reality application; and
   selecting the first corrective action as a movement of the device from the current location to a first location of the second plurality of locations within the communication network, wherein a predicted future QoS for the first location is related to a reduction of a latency at the first location.

4. The system of claim 2, wherein the operations further comprise:
   determining the type of the application currently executing on the device is a voice application; and
   selecting the first corrective action as a movement of the device from the current location to a second location of the second plurality of locations within the communication network, wherein a predicted future QoS for the second location is related to a change in a voice quality at the second location.

5. The system of claim 1, wherein the providing the first notification of the first corrective action comprises facilitating an output, at the device, of a suggested navigation from the current location to one of the second plurality of locations within the communication network.

6. The system of claim 5, wherein the providing the first notification of the first corrective action comprises facilitating a rendering, via a display of the device, a predicative map for user-guided navigation.

7. The system of claim 1, wherein the device is a mobile device of the communication network, and wherein the first notification of the first corrective action comprises a recommendation of a physical movement of the mobile device.

8. A method, comprising:
   predicting, by a system comprising a processor, a future reduction in quality of service (QOS) for a user equipment at a current location in a communication network, wherein the predicting is responsive to an expected crowding of communication devices at the current location; and
   in response to the predicting the future reduction in the QoS at the current location, activating, by the system, a service related to notifications and corrective actions, wherein the service related to notifications and corrective actions comprises:

predicting, by the system, expected power performance of the user equipment at a first plurality of locations within the communications network;

analyzing, by the system, the expected power performance to determine certain locations of the first plurality of locations, wherein movement of the user equipment into the certain locations is forbidden;

removing, by the system, the certain locations from the first plurality of locations to determine a second plurality of locations;

predicting, by the system, future QoS values for the second plurality of locations within the communication network resulting in predicted future QoS values for the second plurality of locations within the communication network;

determining, by the system, a threshold QoS level as a function of an application currently executing on the user equipment;

determining, by the system, that a current QoS level for the user equipment within the communication network has degraded below the threshold QoS level for the application currently executing on the user equipment;

in response to the determining that the current QoS level for the user equipment has degraded below the threshold QoS level, selecting, by the system, a first corrective action to be performed at the user equipment, wherein the selecting the first corrective action is performed at least in part based on the predicted future QoS values for the second plurality of locations within the communication network; and providing, by the system and to the user equipment, a first notification of the first corrective action to be performed at the user equipment.

9. The method of claim 8, wherein the selecting the first corrective action to be performed at the user equipment comprises:

determining the application executing on the user equipment is a time sensitive application; and selecting the first corrective action as a movement of the user equipment from the current location to a first location of the second plurality of locations within the communications network based on the application executing on the user equipment being the time sensitive application, and wherein the first corrective action decreases an amount of latency within the communications network.

10. The method of claim 8, wherein the selecting of the first corrective action to be performed at the user equipment comprises:

determining, by the system, the application executing on the user equipment is a non-time sensitive application; and selecting the first corrective action as a movement of the user equipment from the current location to a second location of the second plurality of locations within the communications network based on the application executing on the user equipment being the non-time sensitive application, and wherein the first corrective action increases a quality of a voice communication within the communications network.

11. The method of claim 8, wherein the providing the first notification of the first corrective action comprises facilitating an output, at the user equipment, of an electronic mapping application that indicates alternative navigation routes.

12. A non-transitory machine-readable medium, comprising executable instructions that, when executed by a processor, facilitate performance of operations, comprising:

predicting a future reduction in quality of service (QOS) for a device at a current location in a communication network, wherein the predicting is responsive to an expected crowding of communication devices at the current location; and in response to the predicting the future reduction in the QoS at the current location, activating a service related to notifications and corrective actions, wherein the service related to notifications and corrective actions comprises:

predicting expected power performance of the device at a first plurality of locations within the communications network;

analyzing the expected power performance to determine certain locations of the first plurality of locations, wherein movement of the device into the certain locations is forbidden;

removing the certain locations from the first plurality of locations to determine a second plurality of locations;

predicting future QoS values for the second plurality of locations within the communication network resulting in predicted future QoS values for the second plurality of locations within the communication network;

ascertaining a type of application executing on the device;

determining a first corrective action that includes a movement of the device from the current location to a first location of the second plurality of locations to cause a QoS associated with the device to satisfy a defined QoS level associated with the application executing on the device; and providing a first notification of the first corrective action to the device.

13. The non-transitory machine-readable medium of claim 12, wherein the first location comprises a first latency amount and the current location comprises a second latency amount, and wherein the operations further comprise:

selecting the first location based on the second latency amount being greater than the first latency amount and based on the type of application executing on the device being categorized as a time sensitive application.

14. The non-transitory machine-readable medium of claim 13, wherein the first location comprises a first voice quality level and the current location comprise a second voice quality level, and wherein the operations further comprise:

selecting the first location based on the first voice quality level being a better voice quality than the second voice quality level and based on the type of application executing on the device being categorized as a non-time sensitive application.

15. The system of claim 1, wherein the providing the first notification of the first corrective action comprises providing a heat map showing the predicted future QoS values for the second plurality of locations within the communication network.

16. The system of claim 15, wherein the predicted future QoS values comprise latency values.

17. The method of claim 8, wherein the providing the first notification of the first corrective action comprises providing, by the system, a heat map showing the predicted future QoS values for the second plurality of locations within the communication network.

18. The method of claim 17, wherein the predicted future QoS values comprise latency values.

19. The non-transitory machine-readable medium of claim 12, the operations further comprising determining a threshold QoS level as a function the type of the application executing on the device.

20. The non-transitory machine-readable medium of claim 19, wherein the threshold QoS level comprises a latency value.

\* \* \* \* \*